(12) United States Patent
Robitaille et al.

(10) Patent No.: US 6,997,564 B2
(45) Date of Patent: Feb. 14, 2006

(54) DIGITAL PROJECTION DISPLAY

(75) Inventors: Blaise Rene Robitaille, Penetanguishene (CA); John William Bowron, Penetanguishene (CA)

(73) Assignee: Raytheon Company, Waltham, MA (US)

(*) Notice: Subject to any disclaimer, the term of this patent is extended or adjusted under 35 U.S.C. 154(b) by 8 days.

(21) Appl. No.: 10/830,665

(22) Filed: Apr. 22, 2004

(65) Prior Publication Data
US 2005/0237497 A1  Oct. 27, 2005

(51) Int. Cl.
G03B 21/20 (2006.01)
G03B 21/22 (2006.01)
G03B 21/26 (2006.01)
G03B 21/28 (2006.01)

(52) U.S. Cl. .................. 353/99; 353/30; 353/33; 353/77; 353/102

(58) Field of Classification Search .......... 353/33, 353/76, 77, 78, 79, 98, 99, 119, 30; 359/649, 359/677, 680, 683, 689, 691, 634, 651; 396/373; 348/761
See application file for complete search history.

(56) References Cited

U.S. PATENT DOCUMENTS

| | | | |
|---|---|---|---|
| 5,402,192 A * | 3/1995 | Gelman | 353/78 |
| 5,539,579 A | 7/1996 | Miyatake | 359/634 |
| 5,706,062 A | 1/1998 | Stolov | 348/761 |
| 5,758,940 A | 6/1998 | Ogino | 353/38 |
| 5,760,965 A | 6/1998 | Kim | 359/651 |
| 5,973,848 A | 10/1999 | Taguchi | 359/651 |
| 6,008,951 A * | 12/1999 | Anderson | 359/677 |
| 6,069,749 A * | 5/2000 | Omura | 359/727 |
| 6,139,157 A | 10/2000 | Okuyuma | 353/102 |
| 6,480,681 B1 * | 11/2002 | Neil | 396/373 |
| 6,601,959 B1 * | 8/2003 | Miyata et al. | 353/98 |
| 6,612,704 B1 * | 9/2003 | Ogawa | 353/99 |
| 2001/0050758 A1 | 12/2001 | Suzuki | 353/69 |
| 2003/0011753 A1 | 1/2003 | Sakata | 353/74 |

FOREIGN PATENT DOCUMENTS

GB 22393266 A 3/2004

* cited by examiner

Primary Examiner—Melissa Jan Koval
(74) Attorney, Agent, or Firm—William C. Schubert; Karl A. Vick

(57) ABSTRACT

A digital projection display includes a light source producing a light beam, and an integrator, an illumination lens, an illumination fold mirror, a light director, and a digital light modulator which sequentially process the light beam. The digital projection display further has a projection lens that receives the spatially modulated light beam from the light director and includes two projection lens elements. A projection lens fold mirror is disposed between the two projection lens elements. A projection fold mirror receives the light beam from the projection lens and redirects the light beam to a display.

19 Claims, 3 Drawing Sheets

DIGITAL PROJECTION DISPLAY

This invention relates to an image display and, more particularly, to a compact digital projection display.

BACKGROUND OF THE INVENTION

Image displays are widely used in a range of products, including commercial products such as televisions and computer systems, and industrial and military products such as sensor displays and data displays. The image display typically receives image information in electronic form and uses that image information to modulate a light-producing beam, a light source, or a light beam that is then viewed by the user of the display. The image information may be in either an analog or digital electronic form. Digital information is increasingly used because of its precision and because of the ability to generate and manipulate the electronic information with a computer prior to its use in modulating the light of the display.

A wide variety of image displays are available. In the familiar cathode ray tube, the image information modulates an electron beam incident upon a phosphor screen, which produces visible light responsive to the modulated electron beam. The cathode ray tube has long been used in conventional televisions. In the liquid crystal display, electronic image information alters the state of the pixels of a liquid crystal panel, which in turn modulates a light beam directed through the liquid crystal panel. In a projection display, a light beam is modulated with a digital micromirror device, a liquid crystal display, or otherwise, and is projected onto a display screen.

In some applications there is a need for a medium-sized display that has a small depth for its screen size, has high image contrast for viewing in a range of circumstances, is rugged, is all-digital, is stable in use over a range of temperatures, and is relatively inexpensive. In the process leading to the present invention, the inventors determined that the cathode ray tube is not acceptable because it requires a glass vacuum-tube environment, which is not sufficiently rugged because it can explode if the glass if punctured, and additionally is not compact. Available liquid crystal displays have contrast limitations and cannot display a full grey scale. Additionally, they have too great a temperature sensitivity of their performance, and sometimes must be placed in temperature-controlled enclosures that negate some of the compactness advantages they might otherwise achieve.

The projection display using a digital micromirror device provides a potential approach. However, projection displays in intermediate screen sizes, typically a screen diagonal of from about 10 to about 20 inches, and small depths are not available. In one application, the present inventors seek to provide a projection display that meets all of the requirements indicated above, has a 13 inch display size, and is less than 6 inches deep. This ratio of screen diagonal dimension DD to housing envelope depth HD can be met in larger screen sizes, but it cannot be met with existing configurations in intermediate screen sizes because may components do not scale down in size proportionate to the reduction in the screen size. There is therefore a need for an improved projection display suitable for use in compact applications with an intermediate screen size. The present invention fulfills this need, and further provides related advantages.

SUMMARY OF THE INVENTION

The present approach provides a digital projection display that is particularly useful in the medium display-size range having a diagonal measurement of from about 10 to about 20 inches. The digital projection display has a small depth for its screen size, has high image contrast for viewing in a range of circumstances, is rugged, is all-digital, is stable in use over a range of temperatures, and is relatively inexpensive to produce.

In accordance with the invention, a digital projection display comprises a light source producing as an output a light beam, an integrator that receives the light beam from the light source, an illumination lens that receives the light beam from the integrator, an illumination fold mirror that receives the light beam from the illumination lens, and a light director such as a TIR prism that receives the light beam from the illumination fold mirror. The illumination lens may comprise two illumination lens elements, with the illumination fold mirror positioned between the two illumination lens elements so that the light beam passes through the first illumination lens element, reflects from the illumination fold mirror, and passes through the second illumination lens element to the light director. Thus, "receives the light beam from the illumination lens" may refer to receiving the light beam from one or more of the illumination lens elements. The digital projection display further includes a digital light modulator (such as a digital micromirror device) that receives the light beam from the light director and spatially modulates the light beam. There is a projection lens that receives the light beam in the spatially modulated form from the digital light modulator. The projection lens has at least a first projection lens element and a second projection lens element spaced apart from the first projection lens element. A projection lens fold mirror is disposed between the first projection lens element and the second projection lens element. The light beam passes through the first projection lens element, reflects from the projection lens fold mirror, and passes through the second projection lens element. A projection fold mirror receives the light beam from the projection lens and redirects the light beam.

Preferably, there is a display screen that receives the light beam from the projection fold mirror, and the light beam is incident upon the display screen substantially perpendicularly to the display screen. A color wheel may be positioned to intercept the light beam so that the digital projection display may display images in color. In a particularly preferred embodiment, the illumination fold mirror reflects the light beam through an angle of about 80 degrees, the projection lens fold mirror reflects the light beam through an angle of about 90 degrees, and the projection fold mirror reflects the light beam through an angle of about 72 degrees. Additionally, the throw ratio of the digital light projector, defined as the distance along the light path from the display screen to the nodal point closest to the display screen, divided by the width of the display screen, is about 1.1.

In one application, the digital projection display further includes a housing in which the light source, the integrator, the illumination lens, the illumination fold mirror, the TIR prism, the digital modulator, the projection lens, the projection lens fold mirror, and the projection fold mirror are received. The display screen forms a face of the housing. This digital projection display is preferably quite compact, with the display screen having a display screen diagonal dimension DD, the housing having a housing envelope depth HD and a housing envelope volume V, and wherein a quantity (DD/HD)/V is at least about $2 \times 10^{-3}$ in$^{-3}$, and preferably is at least about $2.5 \times 10^{-3}$ in$^{-3}$. In an application of particular interest, the display screen diagonal dimension DD is about 13 inches, and the housing envelope depth HD is about 5½ inches.

In a most preferred embodiment, a digital projection display comprises a light source producing as an output a light beam, a color wheel that receives the light beam from the light source, an integrator that receives the light beam from the color wheel, an illumination lens that receives the light beam from the integrator, an illumination fold mirror that receives the light beam from the illumination lens and reflects the light beam through an angle of about 80 degrees, and a TIR prism that receives the light beam from the illumination fold mirror. The illumination lens may comprise two illumination lens elements, with the illumination fold mirror positioned between the two illumination lens elements so that the light beam passes through the first illumination lens element, reflects from the illumination fold mirror, and passes through the second illumination lens element to the light director. There is a digital micromirror device that receives the light beam from the TIR prism, modulates the light beam, and sends the light beam back to the TIR prism in a spatially modulated form. A projection lens receives the light beam in the spatially modulated form from the TIR prism. The projection lens has at least a first projection lens element and a second projection lens element spaced apart from the first projection lens element, and there is a projection lens fold mirror disposed between the first projection lens element and the second projection lens element. The light beam passes through the first projection lens element, reflects from the projection lens fold mirror through an angle of about 90 degrees., and passes through the second projection lens element. The digital projection display further includes a projection fold mirror that receives the light beam from the projection lens and redirects the light beam through an angle of about 72 degrees. There is a housing in which the light source, the integrator, the illumination lens, the illumination fold mirror, the TIR prism, the digital modulator, the projection lens, the projection lens fold mirror, and the projection fold mirror are received. The housing has a housing envelope depth HD and a housing envelope volume V. A display screen receives the light beam from the projection fold mirror and forms a face of the housing. The light beam is incident upon the display screen substantially perpendicularly to the display screen. The display screen has a display screen diagonal dimension DD, and wherein a quantity (DD/HD)/V is at least $2 \times 10^{-3}$ in$^{-3}$. The digital projection display in this form may be made in an embodiment that has a display screen dimension DD of 13 inches and a housing envelope depth HD of 5½ inches.

Achieving a medium-range screen size with a small housing envelope depth is not simply a matter of scaling down larger-size projection displays, because many of the components may not be directly scaled down in size proportionately with the display screen dimension. Components such as the lamp, the lamp ballast, the projector lens, the integrator, the digital light modulator, and the electronics cannot be scaled down in size to the same extent as the display screen size. Consequently, although displays with a much larger screen size may be made with a relatively small housing envelope depth, it is much more difficult to achieve a relatively small housing envelope depth with a smaller display screen dimension. The present digital projection display preferably does not use a holographic display, which is used in some other projection displays. Such holographic displays are expensive when produced in small numbers.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
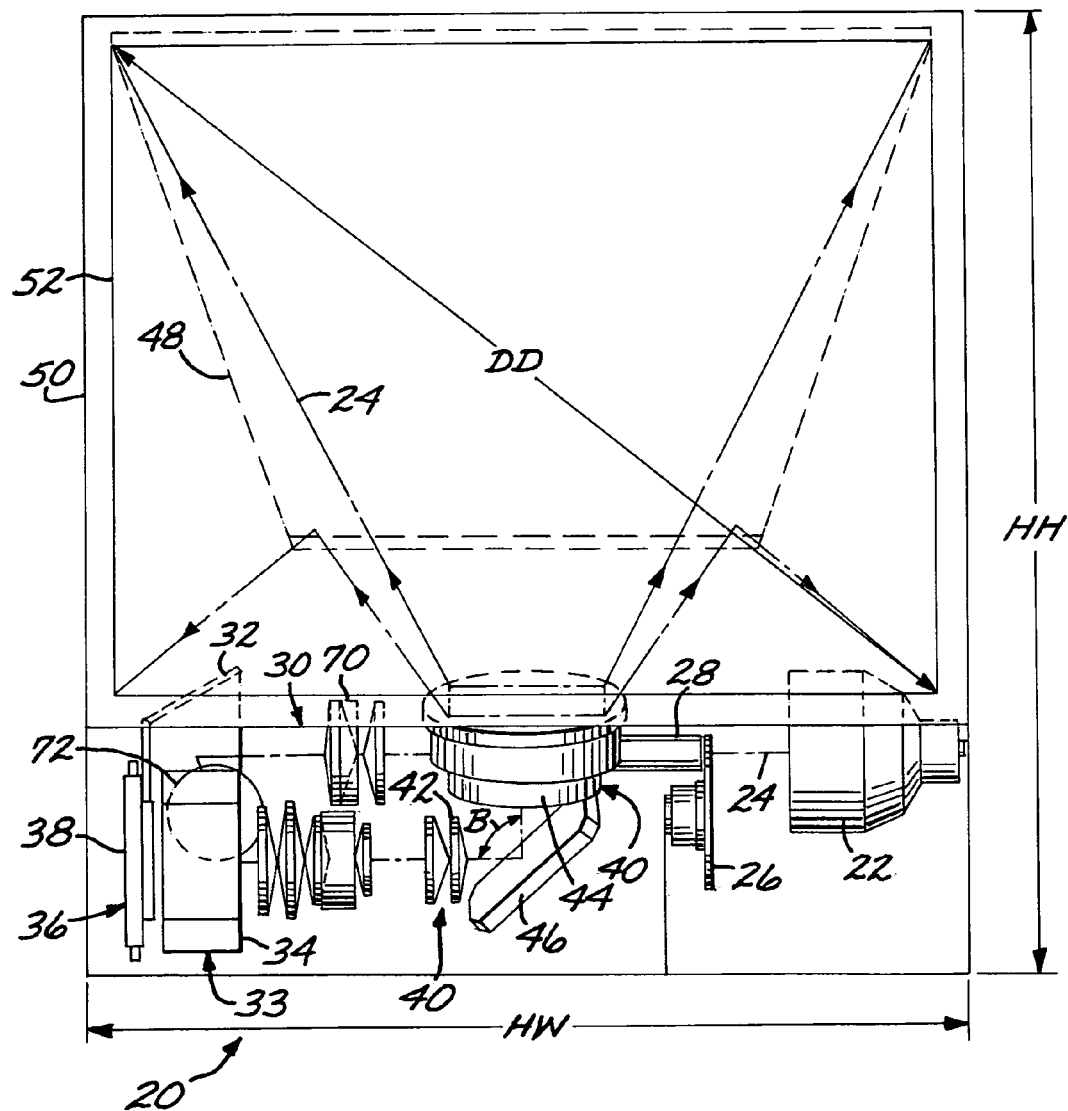
FIG. 1 is a schematic front view of a digital projection display according to an embodiment of the present approach.
Figure 2:
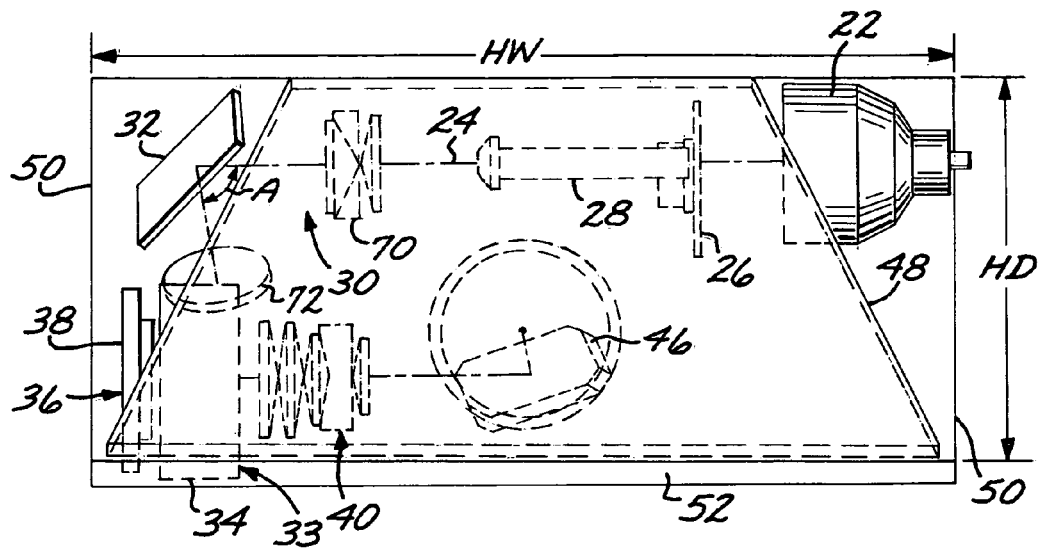
FIG. 2 is a schematic top view of the digital projection display of FIG. 1.
Figure 3:
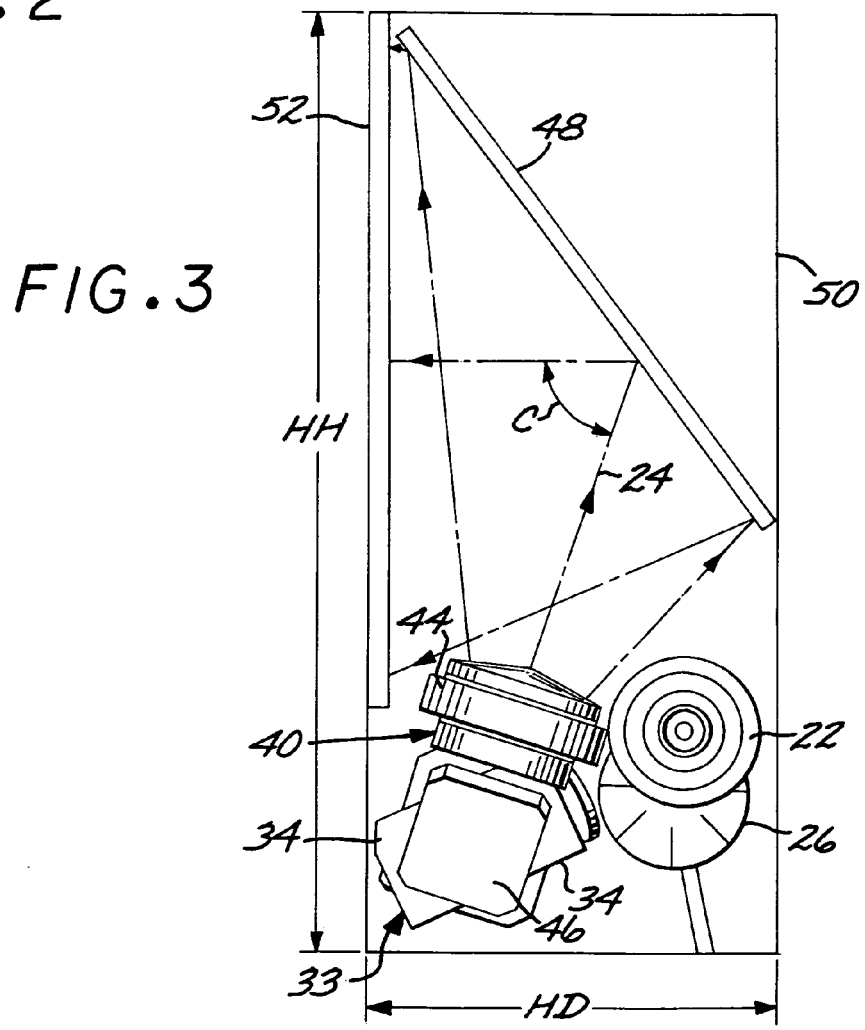
FIG. 3 is a schematic side view of the digital projection display of FIG. 1.
Figure 4:
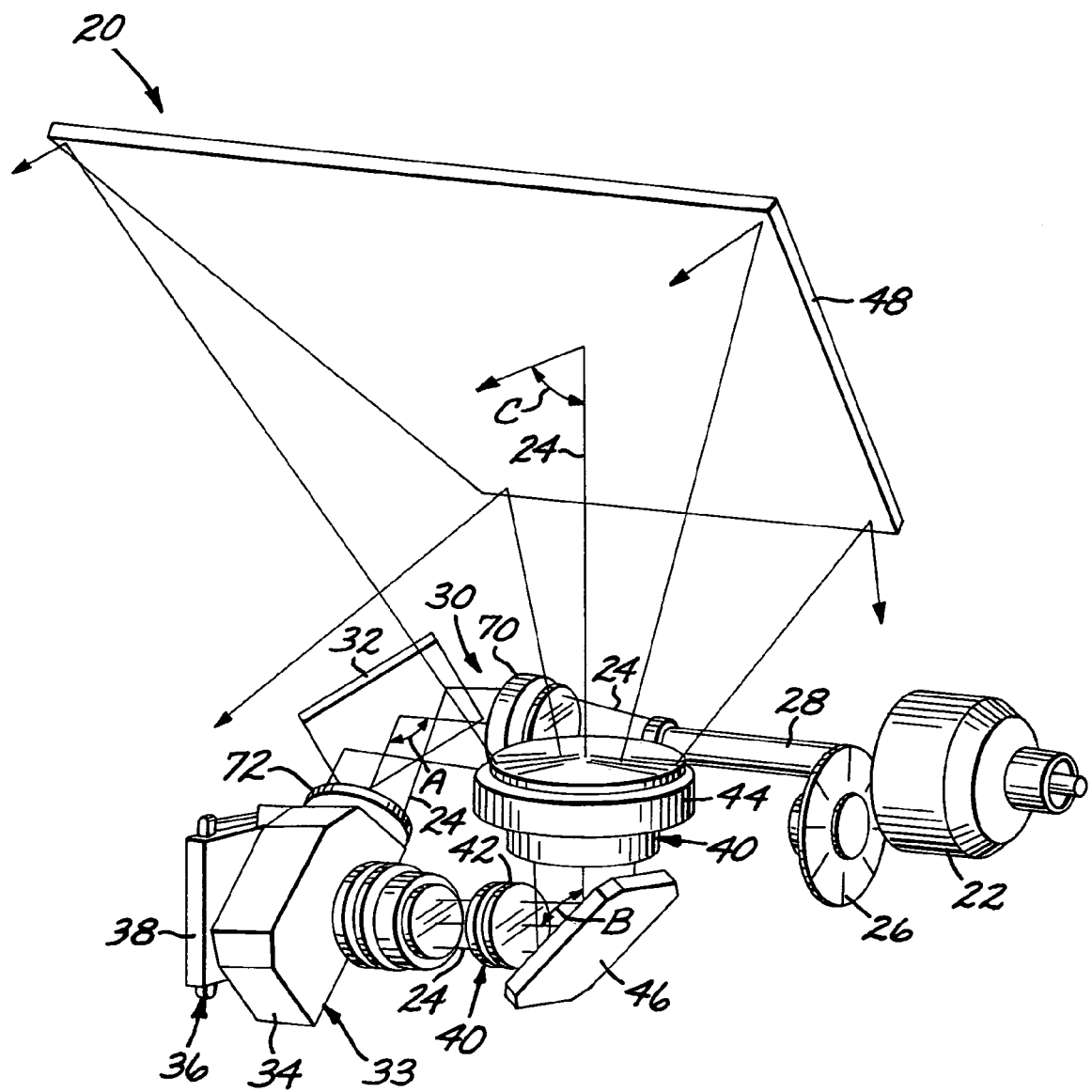
FIG. 4 is a schematic perspective view of the optics of the digital projection display of FIG. 1.

FIGS. 1–4 depict a digital projection display 20 according to an embodiment of the present approach. FIGS. 1–3 show the digital projection display 20 in its isometric views, and FIG. 4 shows the optics of the digital projection display 20 in a perspective view. The structure of the digital projection display 20 is most readily discussed in terms of the order of the components along the light path from the light source to the display screen.

The digital projection display 20 includes a light source 22 producing as an output a light beam 24. The light source 22 may be of any operable type, but is typically a polychromatic light source such as a compact arc lamp.

Optionally but preferably, a color wheel 26 having red, blue, and green segments receives the light beam 24 from the light source 22. The color wheel 26 spins in the light beam 24 so that the light beam 24 is sequentially colored with the primary red-blue-green colors that are combined to produce a full-color image after subsequent modulation. A white fourth segment may also be present. The color wheel 26 is not required if the projected image is to be a black-white image.

An integrator 28 receives the light beam 24 from the color wheel 26 (or directly from the light source in the absence of the color wheel 26). The integrator 28 is preferably a solid transparent rod or a hollow pipe that provides multiple internal reflections of the light beam 24. The integrator has two effects. It makes the light beam 24 more uniform over its cross section and prevents the formation of an image of the filament of the light source 22. Second, the integrator 28 shapes the light beam 24 to have the desired peripheral shape of the final projected image. In the usual case, the final projected image is rectangular, so that the output of the integrator 28 is rectangular with an aspect ratio that matches that of the spatial light modulator. The integrator 28 does not spatially modulate the light beam 24.

An illumination lens 30 receives the light beam 24 from the integrator 28. The illumination lens 30 may include one lens element or more than one lens element. In the illustration, the illumination lens has two illumination lens elements 70 and 72. The illumination lens 30 images the exit end of the integrator 28 onto the digital light modulator to be discussed subsequently.

An illumination fold mirror 32 receives the light beam 24 from the illumination lens element 70 and reflects the light beam 24. The illumination fold mirror 32 changes the direction of the light beam 24. In combination with other fold mirrors in the digital projection display 20, the illumination fold mirror 32 allows the optics of the digital projection display 20 to fit within a compact envelope. In the preferred embodiment, the illumination fold mirror 32 reflects the light beam 24 through an angle A of about 80 degrees. After the light beam 24 reflects from the illumination fold mirror 32, it passes through the illumination lens element 72.

A light director 33, preferably a total internal reflection (TIR) prism 34, receives the light beam 24 from the illumination fold mirror 32. An internal reflective surface (not shown) of the TIR prism 34 is oriented such that the light beam 24 that enters the TIR prism 34 is totally reflected. In an alternative approach, termed an offset approach, a lens directs the light beam 24 to and from the light modulator (discussed next), and there is no TIR prism.

A digital light modulator 36 receives the light beam 24 from the light director 33 (which is preferably the TIR prism 34) and spatially modulates the light beam 24. The digital light modulator 36 receives image information in electronic form from an image source (not shown). The digital light modulator 36 then spatially modulates the light beam 24 with that electronic image information. The digital light modulator 36 is preferably a digital micromirror device 38. The digital micromirror device 38 is an array of movable small mirrors, each of which small mirrors serves as the modulator for one pixel of the resulting image. By controlling the orientations of the individual small mirrors, each pixel of the incident light beam 24 may be selectively reflected in the proper direction to eventually form part of the reflected image (an illuminated pixel), or selectively reflected in another direction so that it does not form part of the reflected image (a dark pixel). The result is that the light beam 24 is spatially modulated.

In the preferred embodiment wherein the light director 33 is the TIR prism 34, the light beam 24 is sent back to the TIR prism 34 in its spatially modulated form. The internal reflective surface of the TIR prism 34 is oriented such that the incident light beam 24 that is received back from the digital light modulator 36 is not reflected by the internal reflective surface and passes straight through the TIR prism 34.

A projection lens 40 receives the light beam 24 in its spatially modulated form from the TIR prism 34 (or directly from the digital light modulator 36 in some embodiments). In the present design, the projection lens 40 has at least a first projection lens element 42, and a second projection lens element 44 that is spaced apart from the first projection lens element 42. Taken together, the lens elements of the projection lens 40 focus the light beam 24 onto the display screen that is viewed by the user of the digital projection display 20, as discussed subsequently. The throw ratio of the projection lens 40 is preferably about 1.1. The throw ratio is defined as the distance along the light path 24 from the display screen to the nodal point closest to the display screen, divided by the width of the display screen.

A projection lens fold mirror 46 is disposed between the first projection lens element 42 and the second projection lens element 44. The light beam 24 passes through the first projection lens element 42, reflects from the projection lens fold mirror 46, and passes through the second projection lens element 44. In the preferred embodiment, the projection lens fold mirror 46 reflects the light beam 24 through an angle B of about 90 degrees.

A projection fold mirror 48 receives the light beam 24 from the projection lens 40 (and specifically from the second projection lens element 44) and redirects the light beam to the display screen to be discussed subsequently. In the preferred embodiment, the projection fold mirror 48 reflects the light beam 24 through an angle C of about 72 degrees.

The digital projection display 20 preferably includes a housing 50 in which the light source 22, the color wheel 26, the integrator 28, the illumination lens 30, the illumination fold mirror 32, the light director 33, the digital light modulator 36, the projection lens 40, the projection lens fold mirror 46, and the projection fold mirror 48 are received. The housing 50 has a housing envelope depth HD, a housing envelope width HW, and a housing envelope height HH. A housing envelope volume V is the product HD times HW times HH, even though the housing 50 may not be a perfectly defined rectangular prism.

The digital projection display 20 preferably includes a display screen 52 that receives the light beam 24 from the projection fold mirror 48. The display screen 52 typically forms one face of the housing 50. The light beam 24 is desirably incident upon the display screen 52 substantially perpendicularly to the display screen 52. As a result, the display screen 52 need not be holographic in structure, with its associated high cost when produced in relatively small numbers, and the projected image on the display screen 52 is not distorted. The display screen 52 has a display screen (maximum) diagonal dimension DD. The display screen 52 is typically rectangular in shape, as illustrated, and the dimension DD is the diagonal dimension of the rectangular shape.

A calculated quantity (DD/HD)/V is preferably at least about $2 \times 10^{-3}$ in$^{-3}$, and preferably is at least about $2.5 \times 10^{-3}$ in$^{-3}$. The ratio (DD/HD) in this calculated quantity expresses the desired large display screen diagonal dimension DD in a small housing envelope depth HD. However, such a large ratio of DD/HD may be achieved in a large housing with large components, but is not easily achieved in a medium-size projection display having DD of from about 10 to about 20 inches, and with a small volume. Many of the components may not be directly scaled down in size to the same extent as the display screen dimension. Components such as the light source, the lamp ballast, the projector lens, the integrator, and the electronics cannot be scaled down in size proportionately to a reduction in the size of the display screen. Consequently, although displays with a much larger screen size may be made with a relatively small housing envelope depth, it is much more difficult to achieve a relatively small housing envelope depth with a smaller display screen dimension. The present digital projection display preferably does not use a holographic display, which is used in some other projection displays. In selecting the design parameters, at first impression it might be thought that it is desirable that the throw ratio be as small as possible to produce a small volume. However, that is not the case, since too short of a throw ratio would interfere with the folding of the beam by the three fold mirrors 32, 46, and 48, because there would be insufficient room for the fold mirrors in the optics structure.

The reflection angles A, B, and C associated with the respective fold mirrors 32, 46, and 48 are chosen cooperatively and not individually. They are chosen to fit the optics of the digital projection display 20 into an acceptably small envelope, and to cause the light beam 24 to have perpendicular incidence upon the display screen 52 to thereby produce an acceptable, undistorted image for the viewer.

That is, these reflection angles may not be chosen arbitrarily and independently of each other to achieve all of these conditions, and were in fact carefully chosen for the preferred embodiment. If the angles A, B, and C are other than 80, 90, and 72 degrees, respectively, the digital light projector 20 is still operable but does not achieve the optimal combination of envelope size and image quality.

The constructions of the light source 22, the color wheel 26, the integrator 28, the illumination lens 30, the illumination fold mirror 32, the TIR prism 34, the digital light modulator 36, the projection lens 40, the projection lens fold mirror 46, the projection fold mirror 48, and the display screen 52 are all known in the art individually for other applications.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A digital projection display comprising:
   a light source producing as an output a light beam;
   an integrator that receives the light beam from the light source;
   an illumination lens that receives the light beam from the integrator;
   an illumination fold mirror that receives the light beam from the illumination lens;
   a light director that receives the light beam from the illumination fold mirror;
   a digital light modulator that receives the light beam from the light director and spatially modulates the light beam;
   a projection lens that receives the light beam in the spatially modulated form from the digital light modulator, wherein the projection lens has at least a first projection lens element and a second projection lens element spaced apart from the first projection lens element;
   a projection lens fold mirror disposed between the first projection lens element and the second projection lens element, wherein the light beam passes through the first projection lens element, reflects from the projection lens fold mirror, and passes through the second projection lens element; and
   a projection fold mirror that receives the light beam from the projection lens and redirects the light beam.

2. The digital projection display of claim 1, wherein the light director comprises a TIR prism.

3. The digital projection display of claim 1, further including a display screen that receives the light beam from the projection fold mirror.

4. The digital projection display of claim 3, wherein the light beam is incident upon the display screen substantially perpendicularly to the display screen.

5. The digital projection display of claim 1, further including
   a housing in which the light source, the integrator, the illumination lens, the illumination fold mirror, the light director, the digital light modulator, the projection lens, the projection lens fold mirror, and the projection fold mirror are received.

6. The digital projection display of claim 5, further including a display screen that receives the light beam from the projection fold mirror, wherein the display screen forms a face of the housing.

7. The digital projection display of claim 6, wherein the light beam is incident upon the display screen substantially perpendicularly to the display screen.

8. The digital projection display of claim 6, wherein the display screen has a display screen diagonal dimension DD, wherein the housing has a housing envelope depth HD and a housing envelope volume V, and wherein a quantity (DD/HD)/V is at least about $2 \times 10^{-3}$ in$^{-3}$.

9. The digital projection display of claim 1, further including
   a color wheel positioned to intercept the light beam.

10. The digital projection display of claim 1, wherein the digital light modulator is a digital micromirror device.

11. The digital projection display of claim 1, wherein the illumination fold mirror reflects the light beam through an angle of about 80 degrees, the projection lens fold mirror reflects the light beam through an angle of about 90 degrees, the projection fold mirror reflects the light beam through an angle of about 72 degrees, and a throw ratio is about 1.1.

12. A digital projection display comprising:
    a light source producing as an output a light beam;
    an integrator that receives the light beam from the light source;
    an illumination lens that receives the light beam from the integrator;
    an illumination fold mirror that receives the light beam from the illumination lens;
    a TIR prism that receives the light beam from the illumination fold mirror;
    a digital light modulator that receives the light beam from the TIR prism and spatially modulates the light beam;
    a projection lens that receives the light beam in the spatially modulated form from the digital light modulator, wherein the projection lens has at least a first projection lens element and a second projection lens element spaced apart from the first projection lens element;
    a projection lens fold mirror disposed between the first projection lens element and the second projection lens element, wherein the light beam passes through the first projection lens element, reflects from the projection lens fold mirror, and passes through the second projection lens element; and
    a projection fold mirror that receives the light beam from the projection lens and redirects the light beam.

13. A digital projection display comprising:
    a light source producing as an output a light beam;
    an integrator that receives the light beam from the light source;
    an illumination lens that receives the light beam from the integrator;
    an illumination fold mirror that receives the light beam, from the illumination lens;
    a TIR prism tat receives the light beam from the illumination fold mirror;
    a digital light modulator that receives the light beam from the TIR prism, spatially modulated the light beam, and sends the light beam back to the TIR prism in a spatially modulated form;
    a projection lens that receives the light beam in the spatially modulated form from the TIR prism, wherein the projection lens has at least a first projection lens element and a second projection lens element spaced apart from the first projection lens element;

a projection lens fold mirror disposed between the first projection lens element and the second projection lens element, wherein the light beam passes through the first projection lens element, reflects from the projection lens fold mirror, and passes through the second projection lens element;

a projection fold mirror that receives the light beam from the projection lens and redirects the light beam;

a housing in which the light source, the integrator, the illumination lens, the illumination fold mirror, the TIR prism, the digital light modulator, the projection lens, the projection lens fold mirror, and the projection fold mirror are received; and a display screen that receives the light beam from the projection fold mirror, wherein the display screen forms a face of the housing.

14. The digital projection display of claim 13, wherein the light beam is incident upon the display screen substantially perpendicularly to the display screen.

15. The digital projection display of claim 13, wherein the display screw has a display screen diagonal dimension DD, wherein the housing has a housing envelope depth HD and a housing envelope volume V, and wherein a quantity (DD/HD)/V is at least at least about $2\times10^{-3}$ in$^{-3}$.

16. The digital projection display of claim 13, further including a color wheel positioned to intercept the light beam.

17. The digital projection display of claim 13, wherein the illumination fold mirror reflects the light beam through an angle of about 80 degrees, the projection lens fold mirror reflects the light beam through an angle of about 90 degrees, the projection fold mirror reflects the light beam through an angle of about 72 degrees, and a throw ratio is about 1.1.

18. The digital projection display of claim 13, wherein the digital light modulator is a digital micromirror device.

19. A digital projection display comprising:

a light source producing as an output a light beam;

a color wheel that receives the light beam from the light source;

an integrator that receives the light beam from the color wheel;

an illumination lens that receives the light beam from the integrator;

an illumination fold mirror that receives the light beam from the illumination lens and reflects the light beam through an angle of about 80 degrees;

a TIR prism that receives the light beam from the illumination fold mirror;

a digital micromirror device that receives the light beam from the TIR prism, spatially modulates the light beam, and sends the light beam back to the TIR prism in a spatially modulated form;

a projection lens that receives the light beam in the spatially modulated from the TIR prism, wherein the projection lens has at least a first projection lens element and a second projection lens element spaced apart from the first projection lens element;

a projection lens fold mirror disposed between the first projection lens element and the second projection lens element, wherein the light beam passes through the first projection lens element, reflects from the projection lens fold mirror through an angle of about 90 degrees, and passes through the second projection lens element;

a projection fold mirror that receives the light beam from the projection lens and redirects the light beam through an angle of about 72 degrees;

a housing in which the light source, the integrator, the illumination lens, the illumination fold mirror, the TIR prism, the digital micromirror device, the projection lens, the projection lens fold mirror, and the projection fold mirror are received, and wherein the housing has a housing envelope depth HD and a housing envelope volume V; and a display screen tat receives the light beam from the projection fold mirror, wherein the display screen forms a face of the housing and the light beam is incident upon the display screen substantially perpendicularly to the display screen, wherein the display screen has a display screen diagonal dimension DD, and wherein a quantity (DD/HD)/V is at least at least about $2\times10^{-3}$ in$^{-3}$.

* * * * *